United States Patent
Böhler

(10) Patent No.: US 6,848,038 B1
(45) Date of Patent: Jan. 25, 2005

(54) PORTABLE DATA CARRIER AND METHOD FOR USING THE SAME IN A PLURALITY OF APPLICATIONS

(75) Inventor: Jürgen Böhler, München (DE)

(73) Assignee: Geisecke & Devrient GmbH, Munich (DE)

( * ) Notice: Subject to any disclaimer, the term of this patent is extended or adjusted under 35 U.S.C. 154(b) by 201 days.

(21) Appl. No.: 10/048,473

(22) PCT Filed: Aug. 2, 2000

(86) PCT No.: PCT/EP00/07492

§ 371 (c)(1),
(2), (4) Date: Jun. 12, 2002

(87) PCT Pub. No.: WO01/11576

PCT Pub. Date: Feb. 15, 2001

(30) Foreign Application Priority Data

Aug. 9, 1999 (DE) .......................... 199 37 529

(51) Int. Cl.$^7$ .............................................. G06F 12/00
(52) U.S. Cl. ...................... 711/163; 711/115; 711/152; 711/164; 235/375; 235/379; 235/380; 235/382; 235/487; 235/492
(58) Field of Search ................................. 711/115, 152, 711/163, 164; 235/375, 379, 380, 382, 487, 492

(56) References Cited

U.S. PATENT DOCUMENTS 4,853,522 A * 8/1989 Ogasawara ................. 235/380
5,401,950 A   3/1995 Yoshida

FOREIGN PATENT DOCUMENTS

| EP | 0152024 | 8/1985 |
|---|---|---|
| EP | 0565389 | 10/1993 |
| WO | WO 87/07063 | 11/1987 |
| WO | WO 92/13322 | 8/1992 |

OTHER PUBLICATIONS

Beutelspacher, Kersten, Pfau: "Chipkarten als Sicherheitswerkzeug", Springer–Verlag, Berlin 1991, ISBN 3–540–54140–3, pp. 76 to 85.

* cited by examiner

*Primary Examiner*—Donald Sparks
*Assistant Examiner*—Bao Quoc Truong
(74) *Attorney, Agent, or Firm*—Bacon & Thomas, PLLC

(57) ABSTRACT

Proposed is a portable data carrier for use in a plurality of applications having a memory device containing at least one data field (21, 31) which can be accessed in several modes by applications realized in a card application device, and an access control device (15) for controlling the accesses to the data fields (21, 31). Each data field (21, 31) has a table (23, 24, 33, 34) assigned thereto which assigns an access right to each possible access mode. Each application accordingly has at least one access right assigned thereto. In the case of an access intent the access control device (15) checks whether the application intending the access has the access right necessary for the intended access.

3 Claims, 2 Drawing Sheets

PORTABLE DATA CARRIER AND METHOD FOR USING THE SAME IN A PLURALITY OF APPLICATIONS

This invention starts out from a portable data carrier according to the preamble of the main claim.

Such a data carrier is known in the form of a smart card from EP 262 025 B1 for example. This print discloses an access system for granting access to data fields of an IC card for multiple services. Each service or application has a specific authentication code. On the IC card each data field additionally has assigned thereto an access information memory which assigns special access rights for that data field to each possible authentication code. The system works in such a way that each service can only access defined data fields in a predetermined mode. However, it necessitates potentially elaborate maintenance of the access information memories. For instance, if a new service or application is to have access to already existing access information memories, the memories of all data fields concerned must be changed.

The invention is based on the problem of providing a portable data carrier for multiple applications and a method for controlling the possibilities of access with respect to the multiple applications which make it easier to perform changes in the application structure.

This problem is solved by a portable data carrier with the features of claim 1 and a method with the features of independent claim 3. The inventive data carrier has the advantage of being easily expandable. New applications can readily be implemented and the associated data fields applied to the data carrier. No intervention in already existing applications or the associated data fields is necessary. No exact knowledge of the already existing applications or data fields is necessary either. Nevertheless, existing data fields can be utilized for different applications without endangering security. In particular, unauthorized encroachments between different applications existing on a data carrier are prevented. All changes in the application structure can be performed anytime. An advantage the method derivable from claim 3 is also that it requires little memory space.

An example of the invention will be explained in more detail in the following with reference to the drawing, in which.

Figure 1:
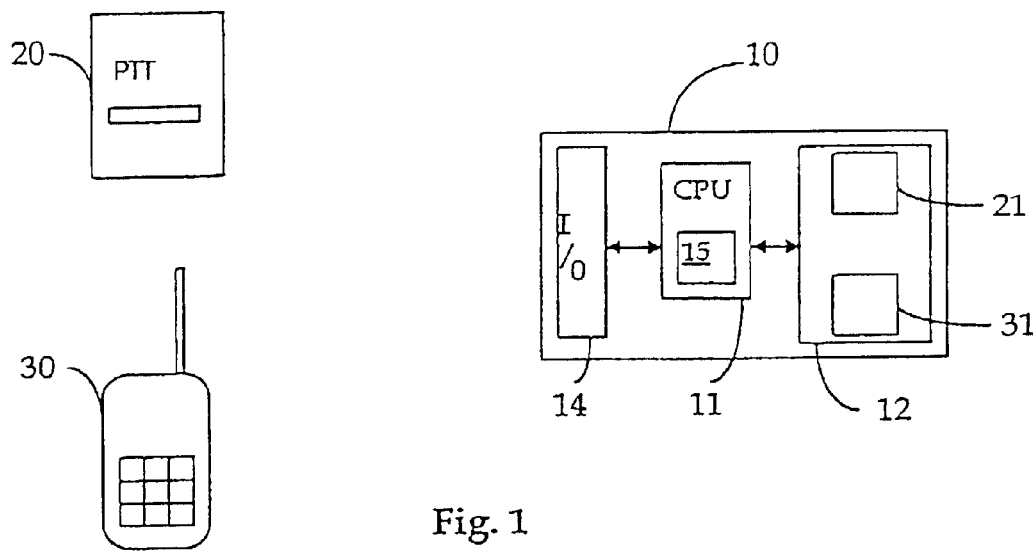
FIG. 1 shows the structure of a data carrier system.

In FIG. 1, reference number 10 designates a data carrier designed for use in a plurality of applications and having the form of a smart card. It bears central processor unit 11 for executing program code realizing various smart card functions, memory device 12 containing the program code to be executed by central processor unit 11, and interface 14 for exchanging data with card application devices 20, 30 realizing various applications. Examples of possible card application devices indicated in FIG. 1 are payment transaction terminal 20 and mobile phone 30. Each card application device 20, 30 serves to realize at least one application having an application data code on smart card 10 corresponding thereto in each case which is formed as separate data field 21, 31 in memory 12. An application realized via card application device 20, 30 can access only data fields 21, 31 for which it has an access authority.

Figure 2:
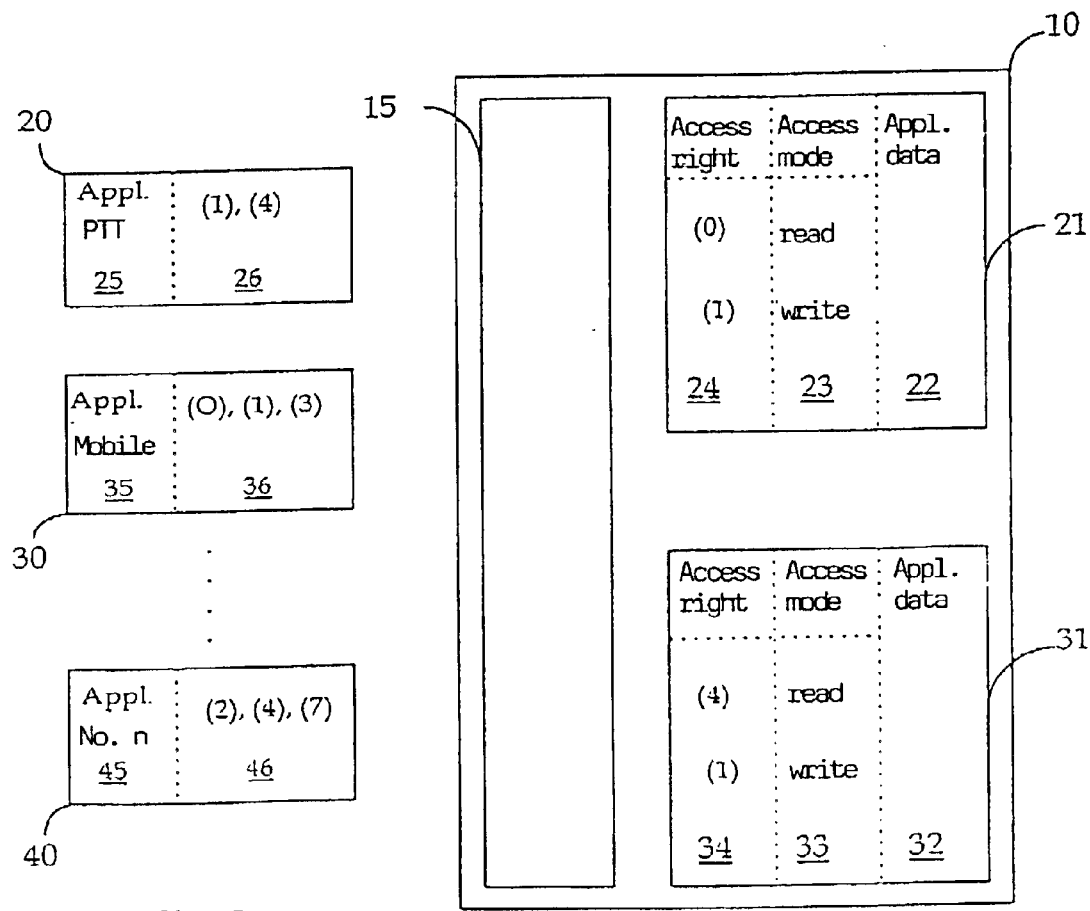
FIG. 2 shows the arrangement of access information in application devices and data carriers.

The structure of the access authority system used is illustrated in FIG. 2. Card application devices 20, 30 are now represented by blocks. Each card application device, i.e. each block 20, 30, is equipped with signaling means (not shown) which make it possible to initiate an access to data field 21, 31 in memory 12 of smart card 10. In parallel with the payment transactions and mobile phone applications mentioned above by way of example, there may be further similar or different card application devices, as indicated by block 40. The data code present in each card application device 20, 30 includes part 35, 45 with the code of an application realizing a card application, for example information about an account in connection with a payment transaction or authentication information for a mobile phone. In addition it includes section 36, 46 with data defining a device-side access status for the user applications existing on card application device 20, 30. The access status data define access rights and access modes such as read, write, etc., stating the mode in which applications can access data field 21, 31 in smart card 10 in each case. Each application can have one or more access rights. Each access right can be symbolized in simple fashion by a number, as indicated in FIG. 2. In the example of FIG. 2, application 20 has access rights (1) and (4) assigned thereto, application 30 access rights (0), (1) and (3), and application 40 access rights (2), (4) and (7).

Smart card 10 is represented in FIG. 2 by access control device 15 and data fields 21, 31 assigned to card application devices 20, 30. Access control device 15 is a subfunction of central processor unit 111 (not shown in detail), while data fields 21, 31 are realized in memory device 12. In analogy to card application devices 20, 30, 40 further data fields, which are omitted in the drawing for clarity's sake, may be present in memory device 12 besides the two indicated.

Corresponding to the access rights of card application devices 20, 30, data fields 21, 31 created on the card have besides wanted data 22, 32 further sections with access information, 23, 24, 33, 34. First section 23, 33 contains the access modes which are possible at all with respect to underlying data field 21, 31, e.g. write, read, etc. Second section 24, 34 assigns to each access mode contained in the first section an access right required for executing the access mode. The access right is stated in agreement with the representation used in the card application devices. It may in simple fashion consist in particular in the assignment of numbers to certain access modes.

Figure 3:
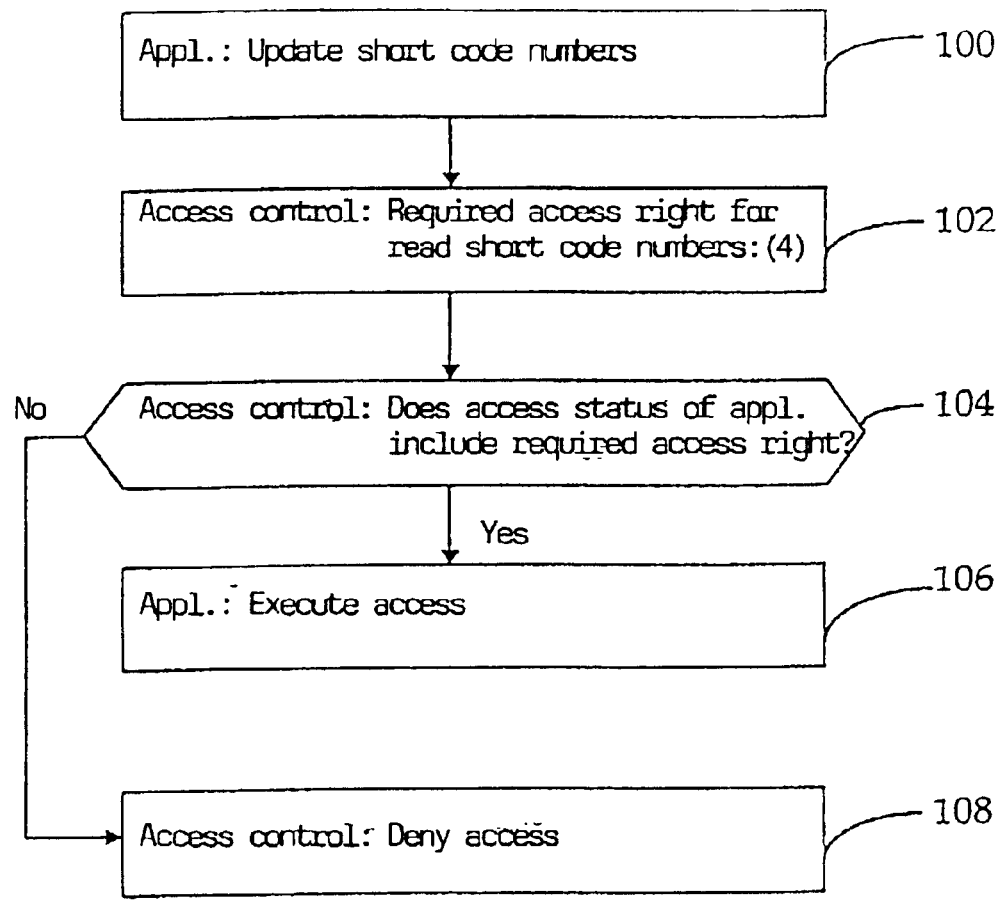
FIG. 3 shows the sequence of an access by an application to a data field.

The access of a user application to data field 21, 31 is controlled by access control device 15. FIG. 3 illustrates the basic method steps involved by the example of a mobile phone situation in which an application acting via the air interface accesses the short code number memory of a smart card used in a mobile phone in order to update the short code number list for example, step 100. When access control device 15, after a corresponding initialization, recognizes that an application—in the example, in the form of an updating application transmitted via the air interface—intends to access card-side data field 21, 31, it first determines the mode of intended access. When it is clear what mode of access is to be performed—in the example, first read and which data field 21, 31 is to be accessed—in the example, the short code number memory—access control device 15 determines from data field 21, 31 with the aid of corresponding table 23, 24, 33, 34 which access right the intended access necessitates on the card side, step 102. The read access mode necessitates for example the access right with number (4). Then access control device 15 determines, step 104, whether the access status assigned to the application on the device side includes the required access right—in the example, the application has on the device side at least access right number (4) for reading. If the access status determined for the application contains the required access right, the access intended by the application is allowed, step 106. If the determined access status of the application does not contain the required access right, or not completely, the intended access is denied, step 108.

The above-described access concept is expandable both outside the card by including further card application devices and inside the card by adding further data fields. When a data field is newly applied to a smart card, access control device 15 expediently adds access information table 23, 24, 33, 34 thereto upon loading. Since the access status data are not specific to data fields, user applications can perform the access modes permitted by their device-side access status with respect to all data carrier-side data fields 21, 31 which necessitate an access right contained in the access status for an access.

What is claimed is:

1. A portable data carrier for use in a plurality of applications comprising:

a memory device containing at least one data field which can be accessed in several modes by at least one user application realized in a card application device, and an access control device which checks the authority of applications intending to access a data field, said data field having assigned thereto a table which assigns to each of the possible access modes an access right to be defined basically without;

wherein the access control device is configured to ascertain the mode of an access to a data field intended by an application, derive an access right assigned to the ascertained access mode from the table of the data field to which an access is intended, and ascertain whether an application intending an access has a certain access right;

wherein at least the access modes of read, write, mask out, and restore have separate access rights assigned thereto.

2. A method for controlling the access of an application realized in a card application device to a data field of a portable data carrier usable for a plurality of applications, comprising the following steps:

assigning to each possible access mode for each data field an access right to be defined basically without reference, the access rights being assigned to an application and to a data carrier independently of each other;

wherein in the case of an access intent, the method further includes the steps of:

ascertaining the mode of the intended access, determining the access right assigned to the ascertained access mode for the data field concerned, ascertaining whether the application intending the access has the assigned access right.

3. A method according to claim 2, wherein an access right is assigned to an access mode upon loading of a data field onto the data carrier.

* * * * *

UNITED STATES PATENT AND TRADEMARK OFFICE
CERTIFICATE OF CORRECTION

PATENT NO. : 6,848,038 B1
DATED : January 25, 2005
INVENTOR(S) : Jürgen Böhler

It is certified that error appears in the above-identified patent and that said Letters Patent is hereby corrected as shown below:

<u>Title page,</u>
Item [73], Assignee, should read -- Giesecke & Devrient GmbH --

Signed and Sealed this

Twenty-fourth Day of May, 2005

JON W. DUDAS
*Director of the United States Patent and Trademark Office*